(12) United States Patent
Matsubara et al.

(10) Patent No.: US 8,078,700 B2
(45) Date of Patent: Dec. 13, 2011

(54) TRANSCODER

(75) Inventors: Masami Matsubara, Tokyo (JP);
Shigeru Imai, Tokyo (JP); Shin Miura,
Tokyo (JP); Takehiko Hanada, Tokyo
(JP); Shinji Akatsu, Tokyo (JP)

(73) Assignee: Mitsubishi Electric Corporation,
Tokyo (JP)

( * ) Notice: Subject to any disclaimer, the term of this patent is extended or adjusted under 35 U.S.C. 154(b) by 757 days.

(21) Appl. No.: 12/087,068

(22) PCT Filed: Dec. 27, 2005

(86) PCT No.: PCT/JP2005/023945
§ 371 (c)(1),
(2), (4) Date: Jun. 25, 2008

(87) PCT Pub. No.: WO2007/074521
PCT Pub. Date: Jul. 5, 2007

(65) Prior Publication Data
US 2009/0012985 A1  Jan. 8, 2009

(51) Int. Cl.
*G06F 15/16* (2006.01)
(52) U.S. Cl. ......... 709/220; 709/203; 709/224; 709/225
(58) Field of Classification Search .................. 709/203, 709/220, 224, 226
See application file for complete search history.

(56) References Cited

U.S. PATENT DOCUMENTS

| 6,421,733 | B1 * | 7/2002 | Tso et al. ...................... 709/246 |
| 6,880,014 | B2 | 4/2005 | Brown et al. |
| 6,970,602 | B1 | 11/2005 | Smith et al. |
| 7,145,898 | B1 * | 12/2006 | Elliott ........................... 370/352 |
| 2003/0014499 | A1 | 1/2003 | Mighdoll et al. |
| 2004/0203851 | A1 | 10/2004 | Vetro et al. |
| 2006/0133414 | A1 * | 6/2006 | Luoma et al. ................. 370/466 |
| 2007/0162981 | A1 * | 7/2007 | Morioka et al. ................ 726/30 |

FOREIGN PATENT DOCUMENTS

| EP | 0859322 A2 | 8/1998 |
| JP | 2002-247668 A | 8/2002 |
| JP | 2002-342192 A | 11/2002 |
| JP | 2002-342218 A | 11/2002 |
| JP | 2002-374298 A | 12/2002 |
| JP | 2004-46789 A | 2/2004 |
| JP | 2005-316905 A | 11/2005 |
| JP | 2005-328443 A | 11/2005 |
| WO | WO-01/59706 A1 | 8/2001 |

OTHER PUBLICATIONS

Fernando M. Matsubara et al. "DTV Architecture Design for Multimedia Network Environments" Consumer Electronics, IEEE Transactions on, vol. 51, No. 1, Feb. 2005, pp. 324-328.
UPnP AV Architecture V.0.83, Jun. 12, 2002, pp. 1-22. (Universal Plug and Play Forum-www.upnp.org).

* cited by examiner

*Primary Examiner* — Khanh Dinh
(74) *Attorney, Agent, or Firm* — Birch, Stewart, Kolasch & Birch, LLP (57) ABSTRACT

A transcoder includes transcoder modules 12 and 13 which convert the formats of contents stored in servers 2 and 3 into formats which can be supported by a renderer 4, respectively, and an internal controller 11 for comparing the format of each content stored in the servers 2 and 3 with the conversion functions of the transcoder modules 12 and 13 to create a transcoder content list in which contents which can be supported are described, and for transferring a content acquisition request to acquire a content to the servers 2 and 3, the content acquisition request being transmitted thereto on the basis of the created transcoder content list.

6 Claims, 6 Drawing Sheets

| Renderer 4 Format List | | 104 |
|---|---|---|
| Format | Address | |
| Renderer | Z | http://192.168.0.5/renderer/ |

Server 2 Content List — 101

| Content | Format | Address |
|---|---|---|
| Title A1 | A | http://192.168.0.1/server2/A1 |
| Title B1 | A | http://192.168.0.1/server2/B1 |

Server 3 Content List — 102

| Content | Format | Address |
|---|---|---|
| Title A2 | B | http://192.168.0.2/server3/A2 |
| Title B2 | B | http://192.168.0.2/server3/B2 |

FIG. 3

Transcoder 1 Transcoder Content List — 103

| Content | Format | Address |
|---|---|---|
| Title A1 | Z | http://192.168.0.9/Transcoder/A1 |
| Title B1 | Z | http://192.168.0.9/Transcoder/B1 |
| Title A2 | Z | http://192.168.0.9/Transcoder/A2 |
| Title B2 | Z | http://192.168.0.9/Transcoder/B2 |
| Title A1 | A | http://192.168.0.1/server2/A1 |
| Title B1 | A | http://192.168.0.1/server2/B1 |
| Title A2 | B | http://192.168.0.2/server3/A2 |
| Title B2 | B | http://192.168.0.2/server3/B2 |

FIG. 4

| | Renderer 4 Format List | 104 |
|---|---|---|
| | Format | Address |
| Renderer | Z | http://192.168.0.5/renderer/ |

FIG. 5

Format of Content

| Photo Content | Format |
|---|---|
| Title A1 | MIME=image/jpeg |
| Title B1 | DLNA.ORG_PN=JPEG_LRG |
| ⋮ | ⋮ |

| Audio Content | Format |
|---|---|
| Title C1-LPCM | MIME=audio/L16 |
| Title D1 | DLNA.ORG_PN=LPCM |
| ⋮ | ⋮ |

| AV Content | Format |
|---|---|
| Title E1 | DLNA.ORG_PN=MPEG_PS_NTSC |
| Title F1 | DLNA.ORG_PN=MPEG_TS_HD_NA |
| Title G1 | DLNA.ORG_PN=MPEG_PS_NTSC |
| ⋮ | ⋮ |

TRANSCODER

FIELD OF THE INVENTION

The present invention relates to a transcoder disposed on a network.

BACKGROUND OF THE INVENTION

Conventionally, a content can be provided from a server on a network to a renderer under control of a controller. Concretely, in nonpatent reference 1, a system in which a controller, which is called a control point, controls both a server and a renderer on a network so as to transfer a content in the server to the renderer transferred thereto, and the renderer decodes the content and displays this decoded content is described. In the above-mentioned system, when the format of the content stored in the server differs from any format which the renderer supports, the transcoder in the server converts the format of the content and then provides this content to the renderer.

Patent reference 1 further discloses, as a related technology, an information processing apparatus provided with an adding means for adding information which is used for performing a process on streaming data to the streaming data, a storing means for storing the streaming data to which the information is added, and a transmitting means for transmitting the streaming data including the information which are stored in the storing means, and further including a transcoder which transcodes them to streaming data as information.

Patent reference 2 discloses a transcoder which is provided with a request processing means for receiving a streaming request made by a client from a network to convert the streaming request, and for transmitting the converted streaming request to a server in behalf of the client, a reply processing means for receiving a reply to the streaming request from the server, and for converting the reply to transmit the converted reply to the client, and a transcoder processing means for converting stream data transmitted from the server, and for transmitting the converted stream data to the client according to both client information and content information in the server which are acquired through the transmission of the streaming request and the reply to the streaming request, and which converts the amount of codes of the stream data, and so on properly in such a way as to support for a required band at the time of communications between the client and the server.

[Patent reference 1] JP.2002-342192.A (see paragraphs 0008 and 0011)
[Patent reference 2] JP.2002-374298.A (see paragraph 0193)
[Nonpatent reference 1] UPnP AV Architecture V.83 Jun. 12, 2002, pp. 1 to 22 (Universal Plug and Play Forum—www.upnp.org)

A problem with the above-mentioned conventional methods is that because a transcoder is included in either each server or each renderer according to the methods, in order to increase the number of content formats which can be supported, many transcoders must be prepared in either each server or each renderer.

Although it can be considered that contents which are coded in many formats are prepared in each server in order to make it possible for the system to support for various formats and methods, such a preparation is not realistic because the required number of formats and the required number of methods are huge.

The present invention is made in order to solve the above-mentioned problems, and it is therefore an object of the present invention to provide a transcoder which does not need to prepare many transcoders in either each server or each renderer in order to increase the number of content formats which can be supported, and which can convert a content having various formats which is stored by each server into a content having a format which each renderer can play back, and can provide the content to each renderer.

DISCLOSURE OF THE INVENTION

A transcoder in accordance with the present invention includes: a transcoder module for converting a format of a content stored in a server on a network into a format which is supported by a renderer on the network which plays back the content; and an internal controller for acquiring a content list which is held by the above-mentioned server so as to compare a format of each content described in the above-mentioned acquired content list with a conversion function of the above-mentioned transcoder module and create a transcoder content list in which contents which can be supported are described, and for transmitting a request to acquire a content to the above-mentioned server, the request being transmitted thereto on the basis of the created transcoder content list, and the above-mentioned transcoder module converts a format of the content transmitted from the above-mentioned server into a format which can be supported by the above-mentioned renderer, and transmits the content having the converted format to the above-mentioned renderer.

Therefore, the present invention offers an advantage of being able to eliminate the necessity to prepare many transcoders in either each server or each renderer in order to increase the number of content formats which can be supported, to provide a renderer with a content by assuming one or more servers to be a single server virtually, and to convert each of contents of various formats which each server store into a content having a format which each renderer can play back and then provide this content.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
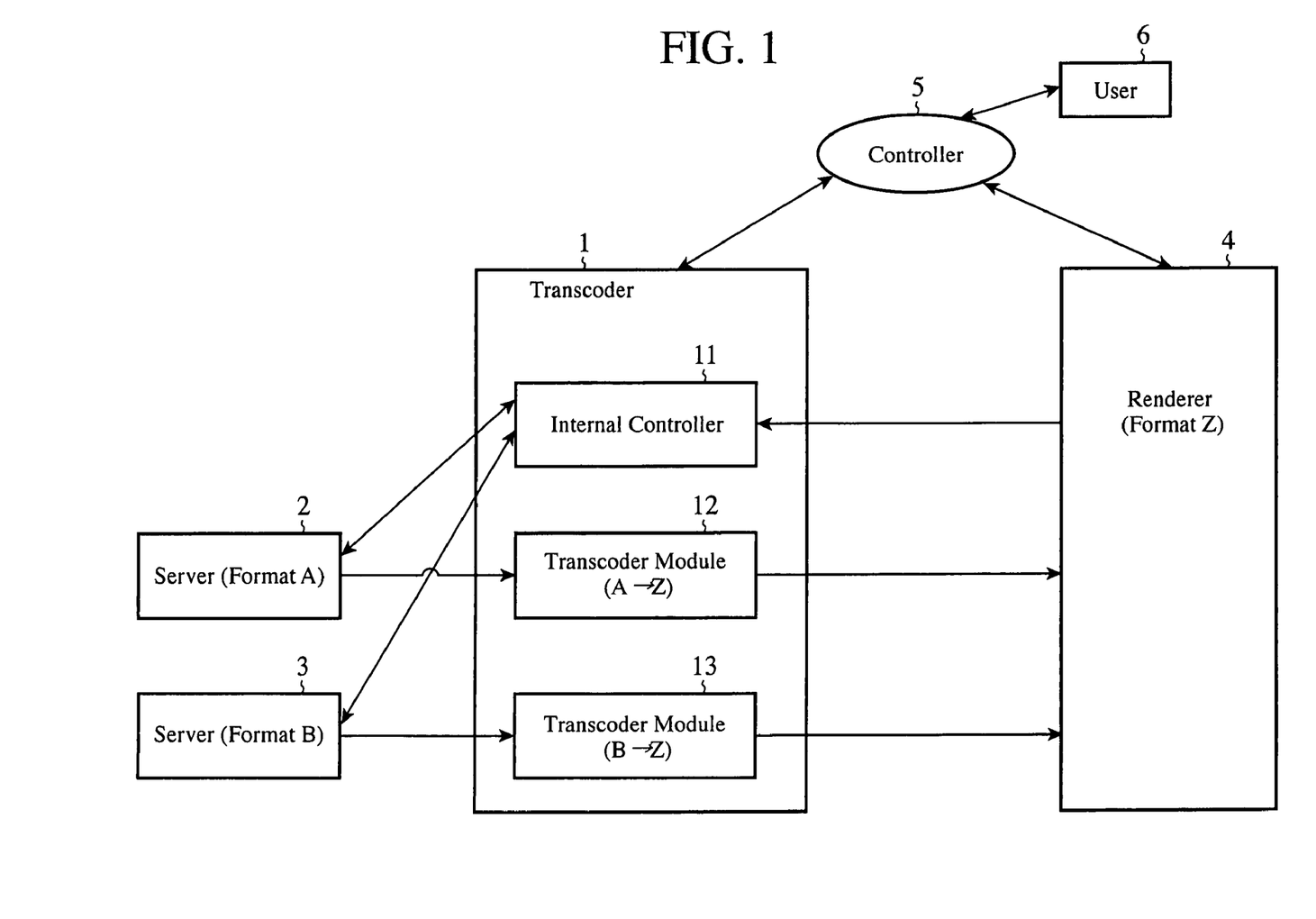
FIG. 1 is a block diagram showing the structure of a content playback system to which a transcoder in accordance with Embodiment 1 of the present invention is applied.

FIG. 1 is a block diagram showing the structure of a content playback system to which a transcoder in accordance with Embodiment 1 of the present invention is applied. In FIG. 1, the transcoder 1 which converts the format of a content is connected to servers 2 and 3 each of which provides a content, a renderer 4 which receives, decodes, and plays back a content, and a controller 5 which receives a request from a user 6 and controls the transcoder 1 and the renderer 4. In the example shown in FIG. 1, although the two servers and the single renderer are connected to the transcoder 1, one or more servers and one or more renderers can be alternatively connected to the transcoder 1.

In FIG. 1, the transcoder 1 is provided with an internal controller 11 for controlling the whole of the transcoder, a transcoder module 12 for converting the format A of a content into a format Z, and a transcoder module 13 for converting the format B of a content into the format Z. In FIG. 1, although the transcoder 1 is provided with the two transcoder modules 12 and 13 as an example, the transcoder 1 can be alternatively provided with one or more transcoder modules.

The server 2 stores one or more contents of the format A and the server 3 stores one or more contents of the format B, and the format of a content which the server 2 provides is not necessarily in agreement with that of a content which the server 2 provides. According to a playback request to playback a content from the controller 5 which has received a request from the user 6, the renderer 4 transmits an acquisition request to acquire the content to the transcoder 1, receives and decodes the content whose format has been converted into the format Z by the transcoder 1, and plays back the decoded content.

Figure 2:
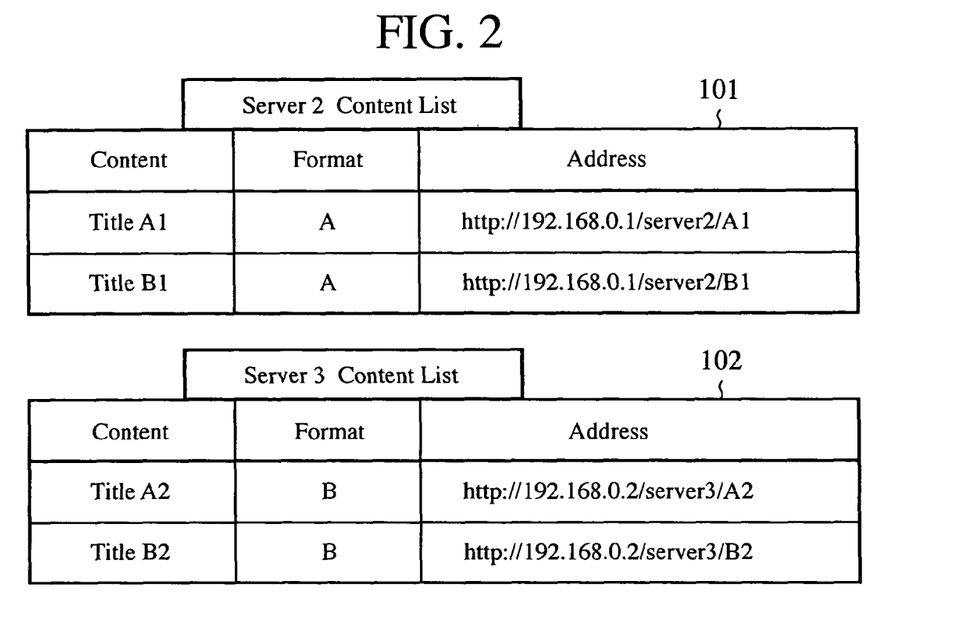
FIG. 2 is a diagram showing a content list which a server in accordance with Embodiment 1 of the present invention holds.

FIG. 2 is a diagram showing content lists 101 and 102 which the servers 2 and 3 hold, respectively. In the content list 101 which the server 2 holds, information indicating that the format is A and the address of the server 2 are described for both a content of title A1 and a content of title B1 which are stored in the server 2. In the content list 102 which the server 3 holds, information indicating that the format is B and the address of the server 3 are described for both a content of title A2 and a content of title B2 which are stored in the server 3.

Figure 3:
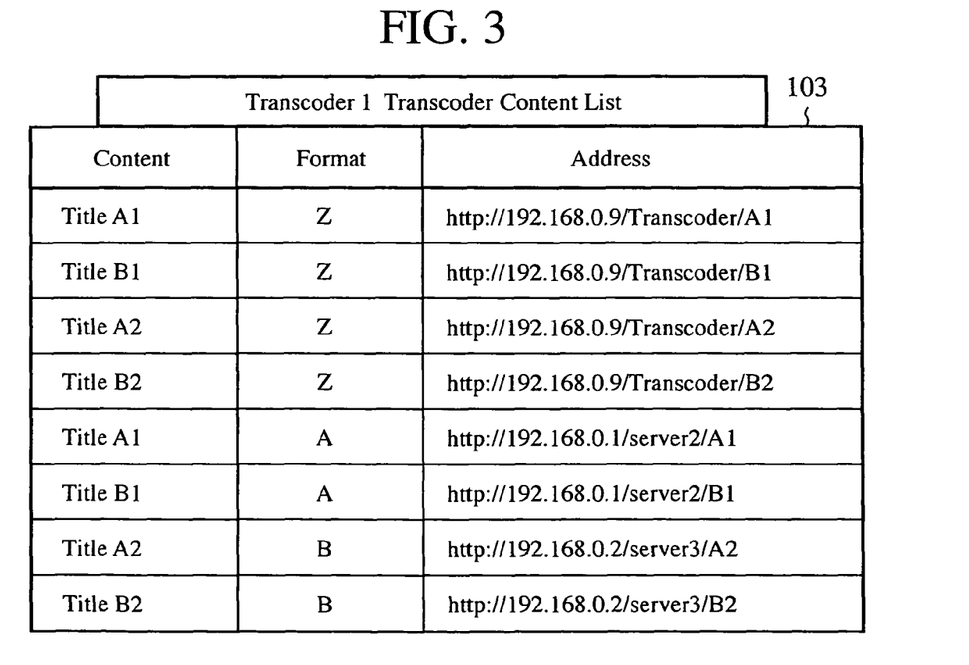
FIG. 3 is a diagram showing a transcoder content list in which includes content items in formats supported by the transcoder in accordance with Embodiment 1 of the present invention.

FIG. 3 is a diagram showing a transcoder content list 103 in which contents which the transcoder 1 can support are described. In the fifth through final rows of the transcoder content list 103, the contents of the content lists 101 and 102 shown in FIG. 2 are described. Furthermore, in the first through fourth rows of the transcoder content list 103, information indicating that the format is Z which is converted from A and the address of the transcoder 1 are described for both the content of title A1 and the content of title B1 which can be supported, and information indicating that the format is Z which is converted from B and the address of the transcoder 1 are described for both the content of title A2 and the content of title B2 which can be supported.

In the example shown in FIG. 3, contents of the format A and contents of the format B which can be supported by the transcoder 1 are shown, though, for example, if the server 2 stores content of the format Z in addition to content of the format A, information about the content of the format Z is included in the content list 101 of the server 2, and the items of the content list 101 are just repeated in the transcoder content list 103.

Figure 4:
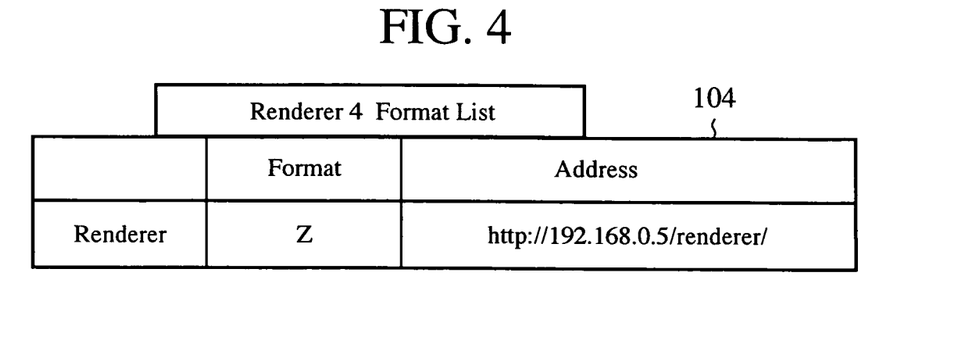
FIG. 4 is a diagram showing a format list in which formats which a renderer in the system in accordance with Embodiment 1 of the present invention can support are described.

FIG. 4 is a diagram showing a format list 104 in which formats which can be supported by the renderer 4 are described. In the format list 104, information indicating that the format which can be supported by the renderer 4 is Z, and the address of the renderer 4 are described.

Various types of contents are included in contents which can be stored in the above-mentioned servers 2 and 3. For example, moving image data which comply with various standards, such as MPEG (Moving Picture Experts Group) 2, MPEG4 Part2, MPEG4 Part10□AVC (Advanced Video Coding), and WMV (Windows (registered trademark) Media Video), static images which comply with various standards, such as JPEG (Joint Photographic Experts Group), Bitmap, and PNG (Portable Network Graphics), and audio data which comply with various standards, such as LPCM (Linear Pulse Code Modulation), MP3 (Moving Picture Experts Group-2 Audio Layer-3), AAC (Advanced Audio Coding), and MPEG4, are included in contents which can be stored in the above-mentioned servers 2 and 3.

Figure 5:
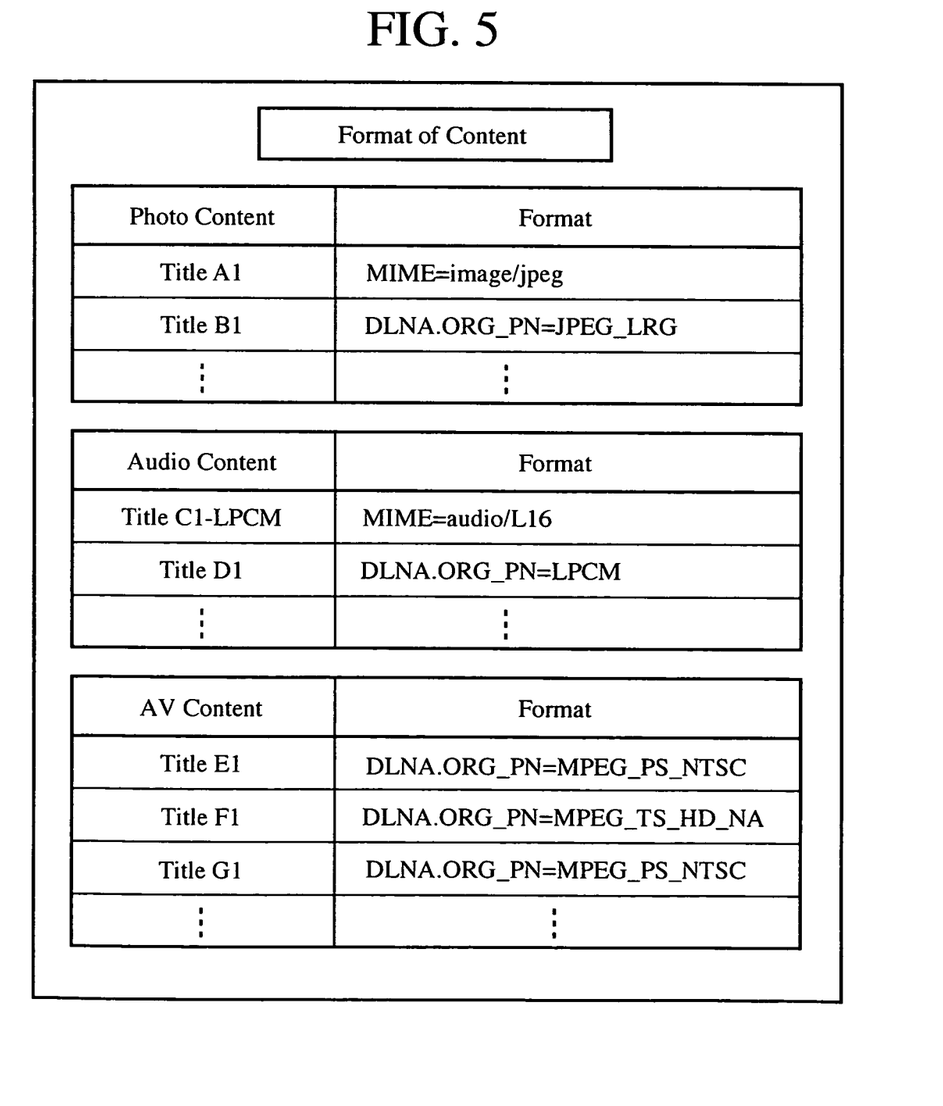
FIG. 5 is a diagram showing an example of the format description using MIME and DLNA of photo content, audio content, and AV content stored in the server in the system in accordance with Embodiment 1 of the present invention.

FIG. 5 is a diagram showing an example of the formats of photo contents, audio contents, and AV contents which can be stored in the servers 2 and 3 in a case in which MIME (Multipurpose Internet Mail Extension) and DLNA (Digital Living Network Alliance) are used to describe the formats. As shown in FIG. 5, the formats of photo contents, audio contents, AV contents, etc., are defined by MIME or DLNA profile names (ORG_PN:Organization-Profile Name) as the identifiers of content formats, can be used as the formats of contents which can be stored in the servers 2 and 3.

Figure 6:
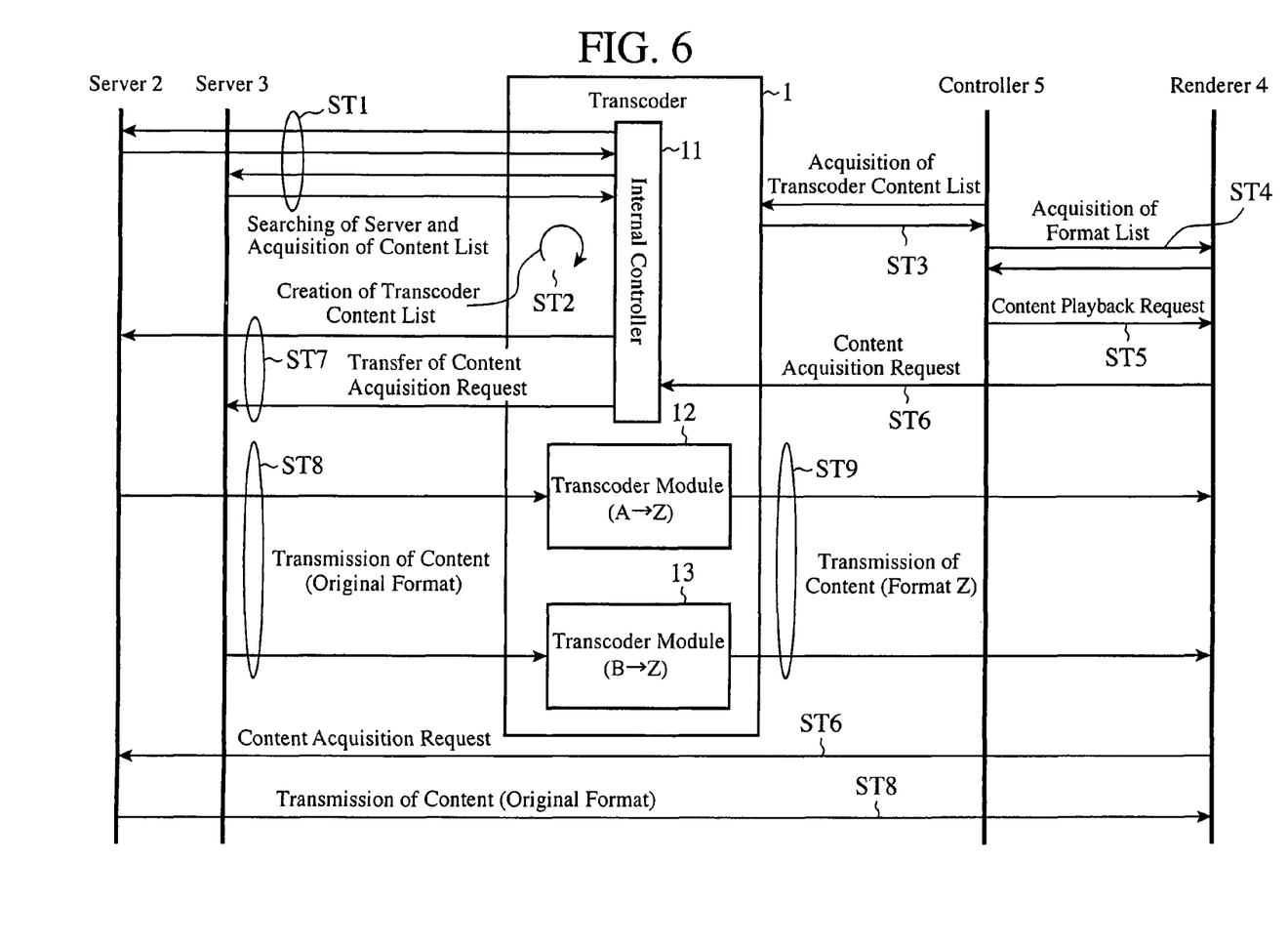
FIG. 6 is a diagram showing the operating sequence of the content playback system to which the transcoder in accordance with Embodiment 1 of the present invention is applied.

FIG. 6 is a diagram showing the operating sequence of the content playback system to which the transcoder in accordance with Embodiment 1 of the present invention is applied.

In step ST1, the internal controller 11 of the transcoder 1 searches through the servers 2 and 3 on the network so as to acquire the content lists 101 and 102 as shown in FIG. 2 which the servers 2 and 3 hold respectively.

In step ST2, the internal controller 11 of the transcoder 1 compares the content formats described in the acquired content lists 101 and 102 with the conversion functions of the transcoder modules 12 and 13 which the transcoder 1 has therein so as to determine content formats whether the transcoder 1 can support, and creates a transcoder content list 103 as shown in FIG. 3 by describing the contents of the content lists 101 and list 102 which the servers 2 and 3 hold respectively in the transcoder content list 103, and by describing information indicating that the format is Z which is converted from A and the address of the transcoder 1 for both the content of title A1 and the content of title B1 which can be supported in the transcoder content list 103, and also describing information indicating that the format is Z which is converted from B and the address of the transcoder 1 for both the content of title A2 and the content of title B2 which can be supported in the transcoder content list 103.

The controller 5, in step ST3, acquires the transcoder content list 103 as shown in FIG. 3 which the internal controller 11 of the transcoder 1 has created in response to a playback request to play back a content from the user 6, and the controller 5, in step ST4, acquires the format list 104 as shown in FIG. 4 from the renderer 4.

The controller 5, in step ST5, compares the transcoder content list 103 acquired in above-mentioned step ST3 with the format list 104 acquired in above-mentioned step ST4, selects the content which the content playback system is requested to play back by the user 6 from the available contents, and transmits a playback request to play back the content including the address for specifying the content which the content playback system is requested to play back by the user 6 to the renderer 4.

At that time, in a case in which the content playback system has been requested to play back a content of the format A or B by the user 6, the controller 5 specifies, as the address for specifying the content, the address of the server 2 or 3 supporting format A or B in the transcoder content list 103, whereas in a case in which the content playback system has been requested by the user 6 to play back a content of the format Z which can be supported by the renderer 4, the controller 5 specifies, as the address for specifying the content, e.g. the address of the transcoder 1 which converts contents to the format Z.

The renderer 4, in step ST6, receives the playback request from the controller 5, and refers to the address for specifying the content and transmits an acquisition request to acquire the content to either the transcoder 1 or the server 2 or 3. More specifically, when the renderer 4 receives a playback request to play back a content of the format A or B, the renderer 4 transmits an acquisition request to acquire the content to the server 2 or 3, whereas when the renderer 4 receives a playback request to play back a content of the format Z, the renderer 4 transmits an acquisition request to acquire the content to the transcoder 1.

The internal controller 11 of the transcoder 1, in step ST7, analyzes the acquisition request to acquire the content which the transcoder 1 has received, and refers to the address for specifying the content and transfers the acquisition request to acquire the content to the server 2 or 3 which stores the content which the content playback system has been requested to play back.

The server 2 or 3, in step ST8, transmits the content of the format A or B which the server 2 or 3 has been requested to transmit by the internal controller 11 of the transcoder 1 to the transcoder module 12 or 13 of the transcoder 1. The server 2 which has received the acquisition request to acquire the content of the format A directly from the renderer 4 transmits the content of the format A which the server 2 has been requested to transmit to the renderer 4. This example assumes renderer 4 can also handle format A.

The transcoder module 12 or 13 of the transcoder 1, in step ST9, converts the content of the format A or B transmitted from the server 2 or 3 into an equivalent content of the format Z, and then transmits the content whose format is converted into the format Z to the renderer 4.

The renderer 4 receives either the content whose format is converted into the format Z and which is transmitted from the transcoder 1 or the content of the format A which is transmitted from the server 2, and then plays back the content.

Figure 7:
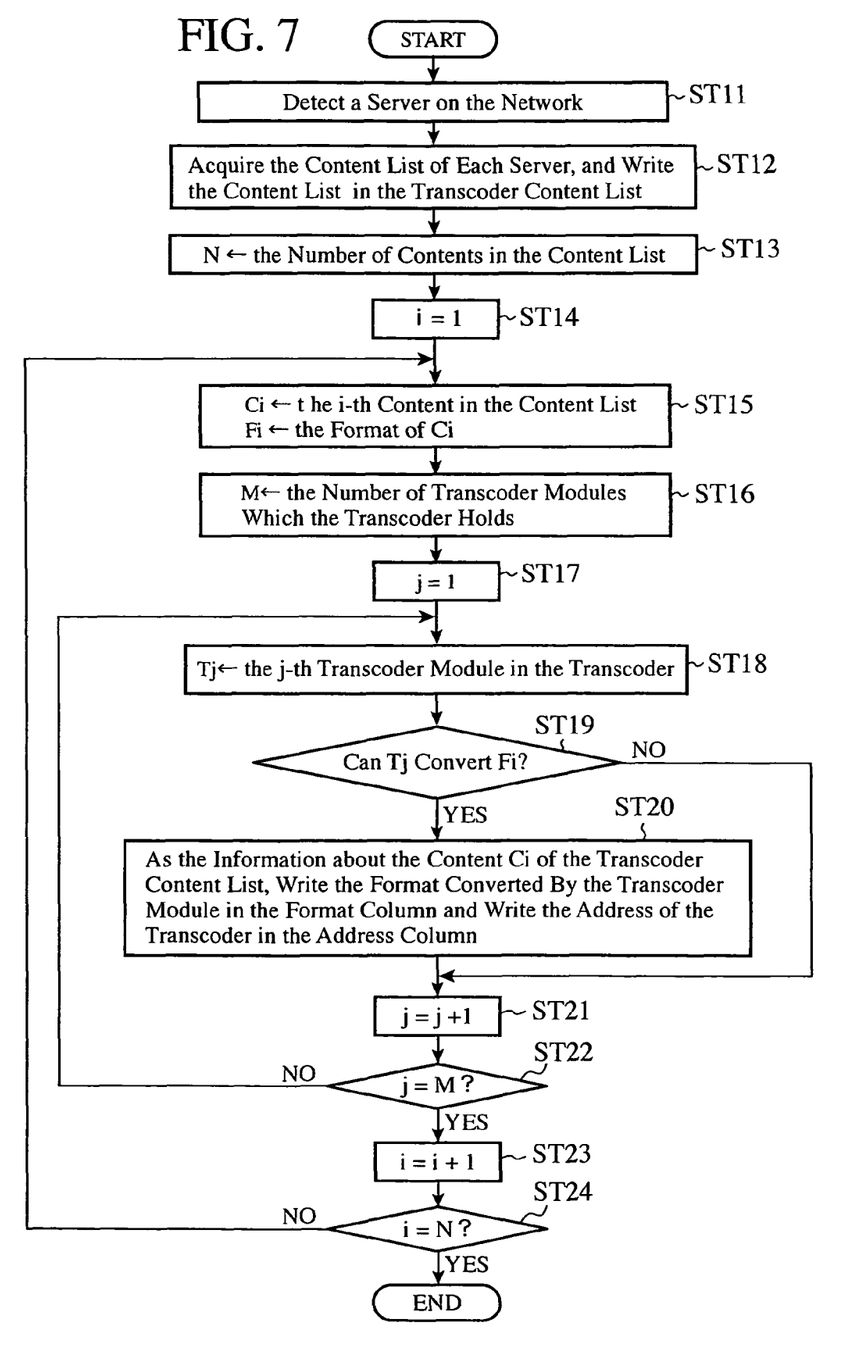
FIG. 7 is a flow chart showing a detailed process at the time when the transcoder in accordance with Embodiment 1 of the present invention creates a transcoder content list.

FIG. 7 is a flow chart showing a detailed process at the time when the transcoder 1 creates the transcoder content list 103.

The internal controller 11 of the transcoder 1, in step ST11, searches through the servers 2 and 3 on the network.

The internal controller 11 then, in step ST12, acquires the content lists 101 and 102 of the servers 2 and 3, and describes the contents of the content lists 101 and 102 in the transcoder content list 103. Through this process, for example, the pieces of information in the fifth through final rows of the transcoder content list 103 shown in FIG. 3 are described.

The internal controller 11, in step ST13, sets the number of contents included in the acquired content lists 101 and 102 to N.

The internal controller 11 then, in step ST14, sets a variable i to 1.

The internal controller 11 further, in step ST15, expresses the i-th content included in the content lists 101 and 102 as Ci, and also expresses the format of the content Ci as Fi.

The internal controller 11, in step ST16, sets the number of transcoder modules which the transcoder 1 has to M.

The internal controller 11 then, in step ST17, sets a variable j to 1.

The internal controller 11 further, in step ST18, expresses the j-th transcoder module included in the transcoder 1 as Tj.

The internal controller 11, in step ST19, judges whether the transcoder module Tj can convert the format Fi.

When judging that the transcoder module Tj can convert the format Fi, the internal controller 11, in step ST20, sets, as a support format, the format Fi and, as information about the content Ci in the transcoder content list 103 shown in FIG. 3, describes the converted format obtained by the transcoder module Tj in the format column and describes the address of the transcoder 1 in the address column, and shifts to step ST21.

In contrast, when judging that the transcoder module Tj cannot convert the format Fi, the internal controller shifts to step ST21.

The internal controller 11, in step ST21, adds 1 to the variable j.

The internal controller 11 then, in step ST22, checks to see whether or not the variable j is equal to the number of transcoder modules M, and, when the variable j is not equal to the number of transcoder modules M, returns to the process of above-mentioned step ST18, or shifts to step ST23 otherwise.

The internal controller 11, in step ST23, adds 1 to the variable i.

The internal controller 11 then, in step ST24, checks to see whether or not the variable i is equal to the number of contents N, and, when the variable i is not equal to the number of contents N, returns to the process of above-mentioned step ST15, or ends this processing otherwise.

As a result of repeating the processes in above-mentioned steps ST13 to ST24, for example, the pieces of information in the first through fourth rows of the transcoder content list 103 shown in FIG. 3 are described.

As mentioned above, in accordance with this Embodiment 1, the transcoder 1 is arranged on the network independently of the server 2 or 3, or the renderer 4, and the transcoder 1 compares the content formats which are described in the content lists 101 and 102 of the servers 2 and 3 with the conversion functions of the transcoder modules 12 and 13 which the transcoder 1 has therein, and determines content formats which the transcoder 1 can support and creates a transcoder content list 103. The transcoder 1 also receives a content which the system has been requested to acquire from the server 2 or 3 by referring to the created transcoder content list 103, and converts the content into an equivalent content having a format which can be supported by the renderer 4 and transmits this content to the renderer 4. Therefore, the present embodiment offers an advantage of being able to eliminate the necessity to prepare many transcoders in either each server or each renderer in order to increase the number of content formats which can be supported, to provide a renderer with a content by assuming one or more servers to be a single server virtually, and to convert each of contents of various formats which each server store into an equivalent content having a format which each renderer can play back and then provide this content.

Embodiment 2

Figure 8:
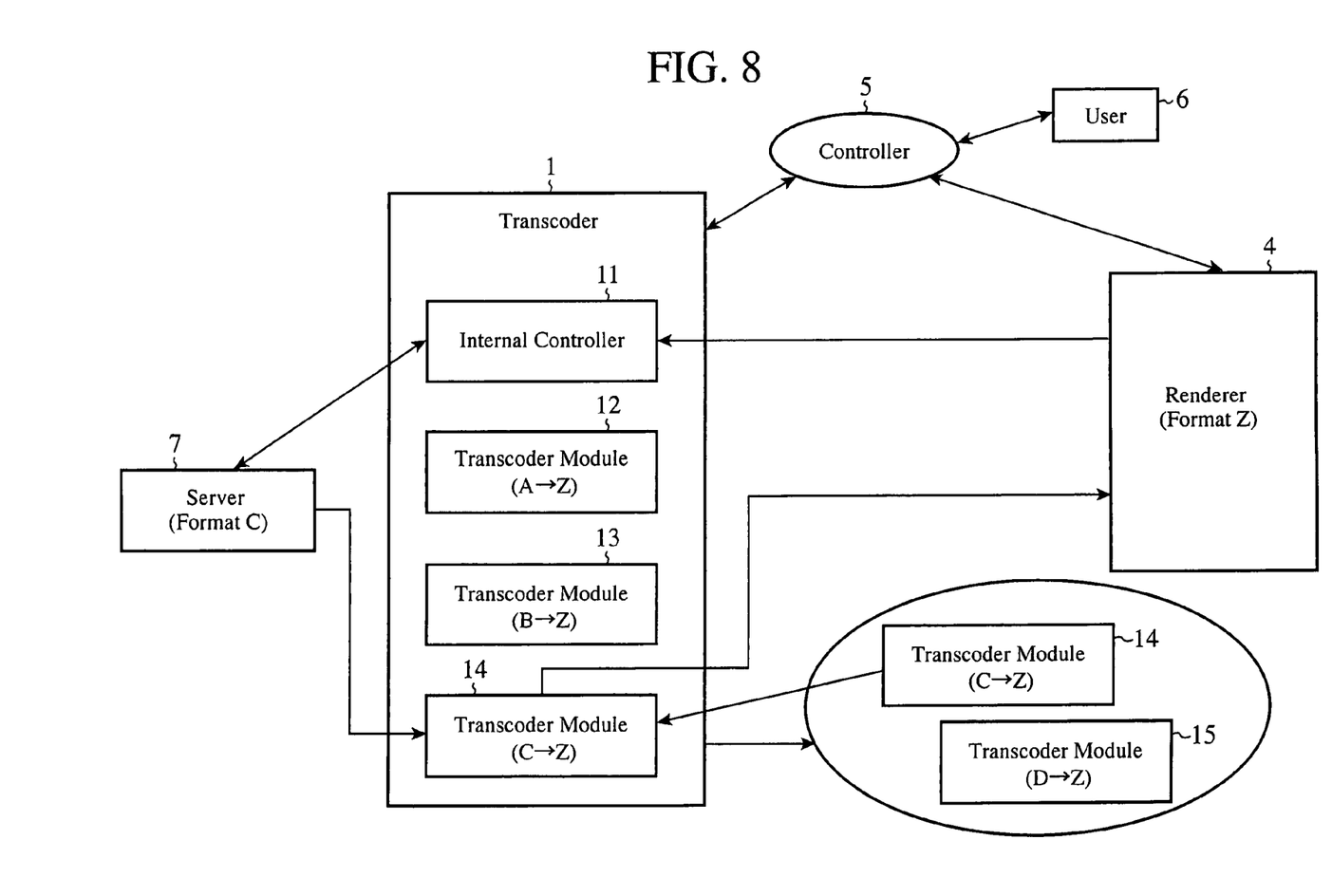
FIG. 8 is a block diagram showing the structure of a content playback system to which a transcoder in accordance with Embodiment 2 of the present invention is applied.

FIG. 8 is a block diagram showing the structure of a content playback system to which a transcoder in accordance with Embodiment 3 of the present invention is applied. In FIG. 8, the transcoder 1 is connected to a server 7 which provides a content, a renderer 4 which receives, decodes and plays back a content, and a controller 5 which receives a request from a user 6 and controls both the transcoder 1 and the renderer 4. In FIG. 8, it is assumed that transcoder modules 14 and 15 on a network are disposed within a website or a server on the Internet.

In accordance with this Embodiment 2, in a case in which no required supportable transcoder module is disposed within the transcoder 1, the content playback system searches for the transcoder module 14 or 15 on the network, and incorporates, e.g. the transcoder module 14 which the content playback system requires into the system by copying or installing the transcoder module 14 and then uses this transcoder module.

The internal controller 11 of the transcoder 1 searches through the server 7 which stores contents of a format C on the network so as to acquire a content list which the server 7 holds.

The internal controller 11 compares the content formats which are described in the content list, which the internal controller has acquired, with the conversion functions of the transcoder modules 12 and 13 which the transcoder 1 has therein, and determines content formats which the transcoder 1 can support.

In a case in which no required transcoder module is disposed within the transcoder 1, the internal controller 11 searches for the transcoder module 14 on the network which can convert the format C which contents stored in the server 7 have into the format Z which can be supported by the renderer 4, and incorporates the transcoder module 14 into the transcoder 1 by copying or installing the transcoder module 14. At that time, the internal controller 11 searches for all the transcoder modules on the network and extracts and incorporates the transcoder module 14, or, in a case in which the internal controller 11 acquires the address of the transcoder module 14 which can convert the format C into the format Z beforehand, searches for and incorporates the transcoder module 14 into the transcoder by using the address.

The internal controller 11 then creates a transcoder content list 103 by using the content list acquired from the server 7, and by using the transcoder modules 12, 13, and 14 which the transcoder 1 has therein.

The transcoder module 14 which is incorporated into the interior of the transcoder 1 converts the content of the format C which is transmitted by the server 7 in response to the acquisition request to acquire the content into an equivalent content of the format Z, and transmits this content to the renderer 4.

The other processes are the same as those of above-mentioned Embodiment 1.

As mentioned above, this Embodiment 2 offers the same advantage as that provided by above-mentioned Embodiment 1. Furthermore, this Embodiment 2 offers another advantage of being able to, in a case in which the transcoder 1 is not provided with any required transcoder module, provide contents of various formats by searching for and using a transcoder module on the network.

Industrial Applicability

As mentioned above, the transcoder in accordance with the present invention is suitable for, for example, a system in which the transcoder converts each of contents of various formats which a server stores into an equivalent content having a format which a renderer can play back, and provides the content to the renderer.

The invention claimed is:

1. A transcoder comprising:
a transcoder module for converting, using a processor, a format of a content stored in a server on a network into a format which is supported by a renderer on the network which plays back the content; and
an internal controller for acquiring a content list which is held by said server so as to compare a format of each content described in said acquired content list with a conversion function of said transcoder module and create a transcoder content list in which contents which can be supported by said transcoder are described, and for transferring a request to acquire a content to said server, the request being transmitted thereto on a basis of the created transcoder content list, wherein
said transcoder module converts a format of the content transmitted from said server into a format which can be supported by said renderer, and transmits the content having the converted format to said renderer;
in response to a request from a user, said internal controller transmits the created transcoder content list to a controller which makes a request to play back a content; and
said internal controller receives the request to acquire the content, the request including an address for specifying the content, from said renderer which receives the playback request to play back the content including the address for specifying the content from said controller which has received the transcoder content list, and transfers the content acquisition request which said internal controller has received to said server by referring to the address for specifying the content.

2. The transcoder according to claim 1, wherein said internal controller describes contents of the content list which is held by said server in the transcoder content list.

3. The transcoder according to claim 1, wherein said transcoder module converts a format of a content which is defined by MIME (Multipurpose Internet Mail Extension).

4. The transcoder according to claim 1, wherein said transcoder module converts a format of a content which is defined by DLNA (Digital Living Network Alliance).

5. The transcoder according to claim 1, wherein when said transcoder does not include any transcoder module which said transcoder requires, said internal controller searches for a transcoder module which exists on the network, and incorporates said transcoder module into said transcoder.

6. The transcoder according to claim 5, wherein said internal controller searches for the transcoder module which exists on the network using an address which said internal controller acquires in advance.

* * * * *